United States Patent
Takahashi et al.

(10) Patent No.: US 12,509,101 B2
(45) Date of Patent: Dec. 30, 2025

(54) CONTROL DEVICE

(71) Applicant: TOYOTA JIDOSHA KABUSHIKI KAISHA, Aichi-ken (JP)

(72) Inventors: Yuki Takahashi, Miyoshi (JP); Masateru Udate, Tokyo-to (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 43 days.

(21) Appl. No.: 18/789,700

(22) Filed: Jul. 31, 2024

(65) Prior Publication Data

US 2025/0050895 A1 Feb. 13, 2025

(30) Foreign Application Priority Data

Aug. 8, 2023 (JP) ................ 2023-129462

(51) Int. Cl.
    *B60W 50/06* (2006.01)
    *B60W 60/00* (2020.01)
(52) U.S. Cl.
    CPC ........ *B60W 50/06* (2013.01); *B60W 60/0013* (2020.02)
(58) Field of Classification Search
    CPC ............ B60W 50/06; B60W 60/0013
    See application file for complete search history.

(56) References Cited

U.S. PATENT DOCUMENTS

| | | | |
|---|---|---|---|
| 2018/0107215 A1 | 4/2018 | Djuric et al. | |
| 2019/0248287 A1* | 8/2019 | Ono | B60K 35/10 |
| 2022/0281473 A1* | 9/2022 | LaBarbera | B62D 15/025 |
| 2024/0253648 A1* | 8/2024 | El Amouri | B60W 50/16 |

FOREIGN PATENT DOCUMENTS

JP  2019-533810 A  11/2019

* cited by examiner

*Primary Examiner* — Naeem Taslim Alam
(74) *Attorney, Agent, or Firm* — HAUPTMAN HAM, LLP

(57) ABSTRACT

The control device according to one aspect of the present disclosure generates a first path and a second path using a first control model and a second control model, evaluates the deviation between the generated first path and second path using a compatibility criteria, generates a final path from the first path and the second path by reflecting the evaluation result, and controls the movement of a moving body in accordance with the generated final path. The conformability criteria have been adjusted by user feedback so that the less an intervention operation by the user is performed, the more the first path is prioritized in generate the final path, and the more the intervention operation by the user is performed, the more the second path is prioritized in generate the final path.

5 Claims, 4 Drawing Sheets

CONTROL DEVICE

CROSS REFERENCE TO THE RELATED APPLICATION

This application claims the benefit of Japanese Patent Application No. 2023-129462, filed on Aug. 8, 2023, which is hereby incorporated by reference herein in its entirety.

BACKGROUND

Technical Field

The present disclosure relates to a control technology for a mobile body such as an autonomous driving vehicle.

Description of the Related Art

Japanese Patent Laid-Open No. 2019-533810 (Patent Literature 1) proposes a system for autonomous vehicle control configured to determine vehicle commands from routes, GPS data, and sensor data using a trained neural network.

SUMMARY

One of the objects of the present disclosure is to provide a control technique for suppressing an increase in automatic control nonconformances due to model changes.

The control device according to the first aspect of the present disclosure comprises a storage that stores a first control model and a second control model, and a controller. The first control model is newly deployed with respect to the second control model. The controller is configured to perform generating a first pass by using the first control model, generating a second pass by using the second control model, evaluating a deviation between the generated first pass and the generated second pass by conformability criteria, generating a final pass from the first pass and the second pass reflecting a result of evaluating the deviation, and controlling a movement of mobile body according to the generated final path. The conformability criteria have been adjusted by feedback of a user so that the less an operation of intervention by the user is performed, the more the first path is prioritized in generate the final path, and the more the operation of intervention by the user is performed, the more the second path is prioritized in generate the final path. Note that at least one of the first control model and the second control model may be configured by a neural network, and deep learning may be used as the machine learning method.

According to the present disclosure, it can be expected to reduce the non-conformity of automatic control due to model changes.

DESCRIPTION OF THE EMBODIMENTS

Figure 1:
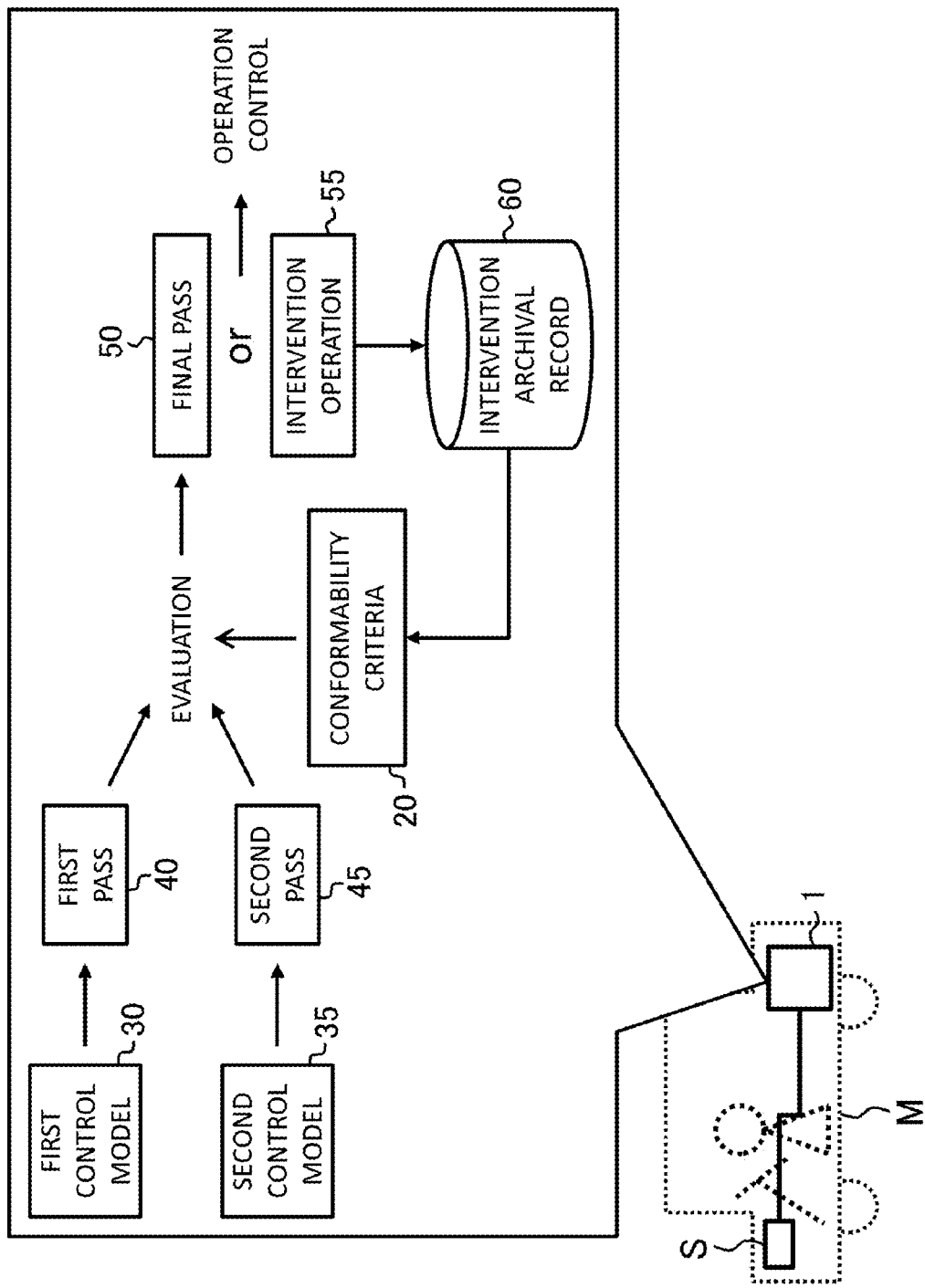
FIG. 1 schematically indicates an example of a situation in which the present disclosure is applied.

Conventionally, rule-based autonomous driving systems are known. Furthermore, according to the method disclosed in Patent Literature 1 and the like, an autonomous driving system can be constructed by using a trained machine learning model. However, the present inventor has found that these conventional methods have the following problems. For example, assume a situation where a model is changed, such as changing from a rule-based model to a machine learning model or updating a machine learning model. Due to this model change, the content of the control instruction (path) in the same environment can change (for example, the timing of performing a lane change changes). In some cases, the content of the instructions may change significantly due to a model change. For example, when a major model change is made, such as changing the model structure (e.g., changing from a rule-based model to a machine learning model, adopting a machine learning model with a different structure), or additionally learning or relearning a large amount of new training data, the content of the instructions is likely to change significantly. When the content of such instructions changes significantly, the control of autonomous driving by the new control model after the change is not necessarily suitable for the user compared to the original control model before the change. In one example, the user may be accustomed to automatic control based on the original control model and may feel uncomfortable with automatic control based on the new control model (i.e., the automatic control may not suit the user). In other words, with a model change, the automatic operation by the control model may no longer conform to the user (i.e., the original control model conformed, but the new control model does not). If the control of automatic driving by the control model is not suitable for the user, an intervention operation by the user occurs, automatic operation is not performed, and manual operation is performed. Increased inconformability of automatic control due to model changes may lead to more frequent intervention operations by the user. This problem point can occur regardless of the type of vehicle. In addition, such problems are not limited to situations where the vehicle is controlled. In terms of controlling movement, the same applies to mobile bodies other than vehicles. Therefore, the same problem can occur in the scene of controlling any mobile body other than the vehicle.

On the other hand, the control device according to the first aspect of the present disclosure comprises a storage and a controller that stores the first control model and the second control model. The first control model is newly deployed for the second control model. The controller is configured to perform generating a first pass by using the first control model, generating a second pass by using the second control model, evaluating a deviation between the generated first pass and the generated second pass by conformability criteria, generating a final pass from the first pass and the second pass reflecting a result of evaluating the deviation, and controlling a movement of mobile body according to the generated final path. The conformability criteria have been adjusted by feedback of a user so that the less an operation of intervention by the user is performed, the more the first path is prioritized in generate the final path, and the more the operation of intervention by the user is performed, the more the second path is prioritized in generate the final path.

In the first aspect of the present disclosure, both the new control model (first control model) and the original control model (second control model) are retained. The conformability criteria are adjusted based on user feedback so that the more the user intervenes, the more the second control model is prioritized over automatic control using the first control model, and the more the user does not intervene, the more the first control model is prioritized. Thereby, when user intervention occurs, the use weight of the second control model is increased, and when user intervention does not occur, the use weight of the first control model is increased. As a result, by narrowing down the usage scene of the first control model to a range where nonconformity does not occur, it can be expected to suppress the increase in automatic control nonconformity due to model change.

As another form of the control device according to the above aspects, one aspect of the present disclosure may be an information processing method that realizes all or part of each of the above components, a program, or a non-transitory computer readable medium (storage medium) that can be read by a machine such as a computer that stores such a program. Here, a computer readable medium is a storage medium in which information such as a program is stored by an electrical, magnetic, optical, mechanical, or chemical action.

[1 Application Example]

FIG. 1 schematically indicates an example of a scene in which the present disclosure is applied. The control device 1 according to the present embodiment is one or more computers configured to control the automatic movement of the target mobile body M. In the present embodiment, the control device 1 is mounted on the mobile body M and holds the first control model 30 and the second control model 35. Each control model (30, 35) is configured to derive a path to perform automatic control of the movement of the mobile body M. The first control model 30 is newly deployed with respect to the second control model 35.

In the present embodiment, the control device 1 generates a first pass 40 by using the first control model 30. Further, the control device 1 generates a second pass 45 by using the second control model 35. The control device 1 evaluates the deviation between the generated first pass 40 and the generated second pass 45 with the conformability criteria 20. The control device 1 generates a final pass 50 from the first pass 40 and the second pass 45 reflecting the result of evaluating the deviation.

In the absence of an intervention operation 55 by the user, the control device 1 controls the operation (movement) of the mobile body M according to the generated final path 50. On the other hand, if there is an intervention operation 55 by the user, the control device 1 discards the generated final path 50 or overlaps it with the final path 50 and controls the operation of the moving body M in accordance with the intervention operation 55 by the user. The conformability criteria 20 have been adjusted by feedback of a user so that the less an operation 55 of intervention by the user is performed, the more the first path 40 is prioritized in generate the final path 50, and the more the operation 55 of intervention by the user is performed, the more the second path 45 is prioritized in generate the final path 50.

In the present embodiment, the control device 1 retains both a new control model (first control model 30) and an original control model (second control model 35). The first control model 30 is newer than the second control model 35. Therefore, basically, the first control model 30 is preferentially used over the second control model 35. That is, in the generation of the final pass 50, the first pass 40 takes precedence. However, the control based on the new control model (first control model 30) may not always suit a user who is accustomed to the control based on the original control model (second control model 35). In particular, when the deviation between the first pass 40 and the second pass 45 is large, the control by the first pass 40 is likely not to be suitable (uncomfortable) to a user accustomed to the second pass 45. If it does not suit, an intervention operation 55 by the user may occur.

In the present embodiment, the operation 55 of the intervention by the user is used as an index to evaluate whether or not the control by the new control model (first control model 30) is conformable with the user. When intervention occurs, the control by the new control model is evaluated as not being suitable for the user, and the conformability criteria 20 are adjusted to give greater weight to the use of the original control model (second control model 35) (i.e., to give priority to the second path 45). On the other hand, if no intervention occurs, the control by the new control model is evaluated as being conformable with the user, so the conformability criteria 20 increases the use weight of the new control model (first control model 30) (i.e., the first pass 40). Thereby, the scope of use of the first control model 30 can be narrowed down to a range where nonconformity does not occur, and as a result, it can be expected to suppress an increase in automatic control nonconformity due to model change.

(Mobile Body)

If it can be moved automatically by mechanical control, the type of mobile body M may be appropriately selected according to the embodiment. The mobile body M may be, for example, a movable device such as a vehicle, a flying body, a ship, a robot device, etc. The flying body may be at least one of a manned aircraft and an unmanned aircraft such as a drone. In one example, as shown in FIG. 1, the mobile body M may be a vehicle. The type of vehicle (number of wheels, power source, size, etc.) may be arbitrarily selected. As an exemplary example, the mobile body M may be an automobile having a level 2 or higher autonomous driving ability.

(Controlling the Operation)

In another example, the mobile body M may include a dedicated control device such as a controller, for example. In this case, controlling the operation of the target mobile body M by the control device 1 may comprise indirectly controlling the target mobile body M by giving a derivation result to the dedicated control device. The control device 1 may be deployed at any location. In one example, as shown in FIG. 1, the control device 1 may be mounted on the mobile body M. In another example, the control device 1 may be disposed away from the mobile body M and remotely control the mobile body M. The control device 1 may be configured so that it can be switched at any timing by any operation from the automatic control mode to the manual control mode and from the manual control mode to the automatic control mode of the mobile body M.

(Path)

As long as the path (output of the control model) is capable of controlling the movement of the moving body M, its format is not particularly limited and may be determined appropriately depending on the embodiment. In one example, the path (40, 45, 50) may be configured by one or more control commands. The control command may be configured to indicate the control amount of the mobile body M. In another example, the paths (40, 45, 50) are configured to indicate the future travel path of the mobile body M and may be used to derive one or more control commands. In response, one or more control commands may be determined in any manner from the final path 50. The control models (30, 35) may be referred to as a path planner.

The control command relates to the operation of the mobile body M. The configuration of the control command may be appropriately selected according to the embodiment. In one example, the control command may comprise acceleration, deceleration, steering, or a combination thereof. Acceleration and deceleration may include gear changes. The control command may be configured to indicate control amounts (control instruction values, control output amounts) of the moving object M, such as an accelerator control amount, a brake control amount, a steering wheel steering angle, etc. Further, the control command may further include a command related to the operation of the mobile body M. As an example, when the mobile body M is a vehicle, the control command may include vehicle operations such as turn signals, hazards, horns, communication processing (for example, transmitting data to a center, sending an emergency call, etc.).

(Discard or Overlap)

Discarding (ignoring) may be an immediate switch from automatic control to manual control, i.e., an immediate switch from automatic control by the final pass 50 to manual control according to the operation 55 of intervention by the user. On the other hand, the overlap may be gradually switched from automatic control to manual control (user control).

(Control Model)

The control models (30, 35) are constructed to derive paths according to the environment of the mobile body M. The environment is an event observed at least on the mobile body M itself and its surroundings. In one example, at least a portion of the environment may be observed by one or more sensors S disposed inside or outside the mobile body M. If the sensor S can observe any moving environment of the mobile body M, the type may not be particularly limited, and may be appropriately selected according to the embodiment. In one example, one or more sensors S may include a camera (image sensor), a radar, a LiDAR (Light Detection And Ranging), a sonar (ultrasonic sensor), an infrared sensor, a GNSS (Global Navigation Satellite System)/GPS (Global Positioning Satellite) module, and the like.

If the path can be derived from the environment of the mobile body M, the input/output format of the control model (30, 35) may be appropriately selected according to the embodiment. In one example, at least one of the control models (30, 35) may be configured to derive a path from observation data (sensor data) of a sensor S at one or more points in time. In another example, at least one of the control models (30, 35) may be configured to derive a path from the recognition result of the surrounding environment. In this case, the control device 1 may further include an analysis model for inferring a recognition result of the surrounding environment from the observation data of the sensor S. Alternatively, at least one of the control models (30, 35) may include such the analysis model. The analysis model may be arbitrarily configured by a trained machine learning model or the like. Other information may optionally be added to the inputs of at least one of the control models (30, 35). At least one of the control models (30, 35) may be configured to further accept input of arbitrary information such as, for example, set speed, speed limit, map data, navigation information (route data). When the mobile body M is a vehicle, the optional information may include driving data. Arbitrary information may be appropriately acquired from a device such as a navigation device, an in-vehicle sensor, or the like. Further, the control models (30, 35) may be configured to output the path directly or indirectly to output the path. In the latter case, a path may be obtained by performing arbitrary information processing (interpretation processing) on the output of the control model (30, 35).

The control model (30, 35) may comprise at least one of a trained machine learning model and a rule-based modeled. The rule-based model is configured to match a given input (e.g., information indicating the environment, such as observation data, recognition results of the surrounding environment, etc.) against rules and derive a path depending on the result of the match (according to the matching rule). The rules may be set manually or at least partially automatically. The machine learning model is configured to have one or more operational parameters that can be adjusted by machine learning. One or more operational parameters are used to calculate the desired inference (in the present disclosure, path derivation). Machine learning is the use of training data to adjust (optimize) the values of operational parameters. The machine learning model may be configured by, for example, a neural network, a support vector machine, a regression model, a decision tree model, and the like. The machine learning method may be appropriately selected according to the machine learning model employed (for example, backpropagation method, etc.). Machine learning may include supervised learning, unsupervised learning, and reinforcement learning.

In one example, at least one of the control models (30, 35) may be at least partially composed of a neural network. The structure of the neural network may be appropriately determined according to the embodiment. The structure of a neural network may be specified, for example, by the number of layers from the input layer to the output layer, the type of each layer, the number of nodes (neurons) contained in each layer, the connection relationships between the nodes in each layer, etc. In one example, the neural network may have a recursive structure. Furthermore, the neural network may include any layer, for example, a fully connected layer, a convolutional layer, a pooling layer, a deconvolutional layer, an unpooling layer, a normalization layer, a dropout layer, a Long short-term memory (LSTM), etc. The neural network may have an arbitrary mechanism such as an attention mechanism. The neural network may include any model such as a GNN (Graph neural network), a diffusion model, a generative model (for example, a Generative Adversarial Network, a Transformer, etc.). When a neural network is used for a control model, the weight of the coupling between each node included in the control model and the threshold value of each node are examples of operational parameters. When a machine learning model is employed, an example of the control model may be configured with an end-to-end model structure.

Note that the first control model 30 and the second control model 35 are constructed for the same purpose. That is, the first control model 30 and the second control model 35 are constructed so that the same aspect of movement can be performed in the same or overlapping environments. Since the control required for each scene may be different, the first control model 30 and the second control model 35 may be prepared for each scene. In one example, when the mobile body M is a vehicle, the first control model 30 and the second control model 35 may be prepared for each scene, for example, such as lane change, lane keeping, emergency stop (EDSS: Emergency Driving Stop System), merging yield, automatic parking, etc.

(Newly Deployed)

The first control model 30 may be prepared as a new control model for the second control model 35. That is, the first control model 30 may be a new control model after the change, and the second control model 35 may be the original control model before the change. In one example, a change in the control model may be a replacement of the system. Depending on this, the change of the control model may include, for example, replacing the rule-based modeled with a trained machine learning model, replacing the trained machine learning model with a rule-based model, changing the structure of the machine learning model, and the like. In another example, the change in the model may be a version upgrade. In response, model modifications may include, for example, deploying a new rule-based model with modified rules, deploying a new trained machine learning model updated by additional training or retraining, and the like. Note that each control model (30, 35) (model data) may be appropriately provided from an external server or the like.

In one example, the first control model 30 may be configured by a trained machine learning model. The second control model 35 may be configured by a rule-based model. The structure of trained machine learning models and rule-based models can be different. Therefore, the characteristics of the automatic control of the trained machine learning model and the rule-based model may differ from each other. As a result, when the automatic control system is updated from a rule-based model to a trained machine learning model, the control by the trained machine learning model may not be suitable for users accustomed to control by the rule-based model. According to an example of the present embodiment, even when updating such an automatic control system, it can be expected to suppress an increase in automatic control inconformity due to a model change due to the action of the arbitration process according to the conformability criteria 20.

In another example, the first control model 30 may be configured with an updated trained machine learning model. On the other hand, the second control model 35 may be configured by a trained machine learning model before updating. The update may include at least one of the replacement and version upgrade of the above system. The update may include any process that can change the output of the control model. The update may include, for example, modifying the value of the parameter by additional learning or relearning, changing the structure of the model, and the like. According to one example of the present embodiment, it can be expected to suppress an increase in automatic control inconformity due to model update.

Note that the number of control models held by the control device 1 may not necessarily be limited to two. The number of the first control model 30 may not be limited to one. The number of the second control model 35 may not be limited to one. Using the first control model 30 may include using one or more first control models 30. Using the second control model 35 may include using one or more second control models 35. In another example, the control device 1 may hold three or more control models. In order to correspond to each of the first control model 30 and the second control model 35, among the three or more control models, the order of the control model that is preferred as there is intervention and the control model that is preferred as there is no intervention may be defined. The control device 1 may be configured to perform a mediation process according to the conformability criteria 20 between the three or more control models and generate a final pass 50. That is, generating the final pass 50 from the first pass 40 and the second pass 45 may include generating the final pass 50 from three or more paths. Typically, the first control model 30 is a control model one generation later than the second control model 35. However, the relationship between the first control model 30 and the second control model 35 may not be limited to such examples. The generation difference between the first control model 30 and the second control model 35 may be two or more apart.

(Conformability Criteria)

The conformability criteria 20 is defined to evaluate whether or not the automatic control according to the first control model 30 is conformable with the user for the deviation occurring between the first control model 30 and the second control model 35. If such conformable can be evaluated, the conformability criteria 20 may be set appropriately. Simply, the conformability criteria 20 may comprise a threshold value for a physical index. In one example, the conformability criteria 20 may comprise a threshold value for speed, acceleration, timing of change, or a combination thereof for movement (straight ahead, right turn, left turn, etc.). In this case, adjusting the conformability criteria 20 may consist of updating (ie, modifying) the threshold. The conformability criteria 20 may be defined to evaluate the suitability of the user after identifying at least one of the movement scenes (lane change, etc.) and the movement environment (e.g., location, route, surrounding environment, etc.).

(Generate Final Pass)

Generating the final pass 50 from the first pass 40 and the second pass 45 comprises (I) depending on the result of the evaluation, either the first pass 40 and the second pass 45 is selected as the final pass 50, or (II) the first pass 40 and the second pass 45 are integrated. The final pass 50 is finally derived and is used to control the mobile body M.

When (I) is adopted, prioritizing the path may be to select the preferred path. As a simple example, consider a case where the conformability criteria 20 is given as a threshold for the speed of movement. In this case, the control device 1 may select the second path 45 as the final path 50 if the deviation in speed between the first path 40 and the second path 45 exceeds the threshold of conformability criteria 20 and may select the first path 40 as the final path 50 if this is not the case. The more the intervention operation 55 has not occurred, the more the threshold of the conformability criteria 20 may be adjusted to a larger value, thereby making it easier for the first pass 40 to be selected as the final pass 50. On the other hand, the more the intervention operation 55 occurs, the more the threshold value of the conformability criteria 20 may be adjusted to a small value, thereby making it easier for the second pass 45 to be selected as the final pass 50.

When (II) is adopted, prioritizing a path may mean increasing the ratio during integration. The conformability criteria 20 may include the ratio of this integration with or instead of the threshold value. Adjusting the conformability criteria 20 may include adjusting the value of the integration ratio. The less an intervention operation 55 occurs, the higher the ratio of the first pass 40 may be, and the more an intervention operation 55 occurs, the higher the ratio of the second pass 45 may be. Evaluating the deviation with the conformability criteria 20 may include determining a ratio of integration of each path (40, 45) according to the conformability criteria 20. The integration ratio may be determined according to the degree of deviation between the first pass 40 and the second pass 45 or may be determined independently of the degree of the deviation. Integration may be performed by any operation such as sum, average, weighted average, etc. In one example, in the above case, the control device 1 may determine the ratio of each path (40, 45) according to the conformability criteria 20 and generate the final path 50 by combining the first path 40 and the second path 45 in the determined ratio. In another example, when the conformability criteria 20 adopts a form including the above threshold, in the above case, if the deviation in speed between the first path 40 and the second path 45 exceeds the threshold of the conformability criteria 20, the control device 1 may integrate the first path 40 and the second path 45 to generate the final path 50, and if not, may select the first path 40 as the final path 50.

Note that evaluating the deviation according to the conformability criteria 20 and generating the final pass 50 according to the evaluation result may be executed in at least one of a rule-based and an arithmetic model (machine learning model) base. When the rule base is adopted, the control device 1 evaluates the deviation between the first pass 40 and the second pass 45 according to the conformability criteria 20, and depending on the evaluation result of the deviation, the process (I) or (II) may be executed. When the arithmetic model base is employed, the control device 1 may execute the evaluation of the deviation and the processing of the above (I) or (II) as a series of processes of the arithmetic model. In this case, the conformability criteria 20 may be incorporated into the arithmetic model.

Further, in the present embodiment, when an intervention operation 55 by the user occurs, the conformability criteria 20 is adjusted to increase the use ratio of the second control model 35 (second pass 45). Increasing the usage ratio means, in the above case (I), making it easier to select the second path 45 (e.g., by reducing the threshold value), and in the above case (II), increasing the integration ratio of the second path 45. In one example, after increasing the use specific gravity of the second control model 35 in this way, the conformability criteria 20 may be adjusted to gradually increase the use specific gravity of the first control model 30 to the extent that no user intervention occurs. Thereby, the user's discomfort with the control by the new control model (first control model 30) may be gradually eliminated, and the user may be able to enjoy the benefits of the new control model.

Further, due to the occurrence of an intervention operation 55 by the user, the operation 55 of the intervention by the user may continue to occur even after the priority of the second path 45 is increased. In this case, in one example, the control device 1 may continue to increase the degree of prioritizing the second path 45. In another example, the control device 1 may generate a final pass 50 from the first pass 40 and the second pass 45 using an arithmetic model. The control device 1 may adjust the values of the parameters of its arithmetic model (e.g., the integration ratio of the first pass 40 and the second pass 45) so that an output suitable for the path by the intervention operation 55 is obtained. Note that if automatic control adapting to the user is not executed even if the second path 45 is given maximum priority, the second control model 35 does not conform to the user in the first place, and the newly deployed first control model 30 may not also be compatible with the user. As a result, the first control model 30 and the second control model 35 may have difficulty in generating a path that is suitable for the user. Therefore, in one example, if such a situation occurs, the control device 1 may send information indicating the environmental conditions at the time of intervention and the intervention operation (or path) to the computer providing the control model (e.g., an external server), thereby prompting further updating of the control model.

(User)

The user may refer to a specific user or may refer to unspecified users. In one example, the conformability criteria 20 may be differentiated for each user. In this case, the conformability criteria 20 of the target user may be reflected only in the feedback of the target user. In another example, the conformability criteria 20 may not be differentiated. In this case, the feedback of any user including other users other than the target user may be reflected in the conformability criteria 20, and the obtained conformability criteria 20 may be applied when the target user uses the mobile body M. Note that when the mobile body M is a vehicle, the user is typically a driver.

(Feedback)

In one example, user feedback (presence or absence of intervention operation 55) may be immediately reflected in the conformability criteria 20. In another example, the user's feedback may be accumulated as an intervention archival record 60, and the obtained intervention archival record 60 may be reflected in the conformability criteria 20 after the fact. User feedback may be reflected in adjustments to the conformability criteria 20 (e.g., updating the threshold values) after identifying at least one of the moving scenes and the moving environment. In this case, the conditions (scene, environment, etc.) under which the intervention occurred may be appropriately specified.

When accumulating user feedback as the intervention archival record 60, the items of information to be stored as the intervention archival record 60 may not be particularly limited if the conformability criteria 20 can be adjusted and may be appropriately selected according to the embodiment. In one example, when the conditions under which the intervention occurred are identified and the conformability criteria 20 is adjusted, the intervention archival record 60 may include information indicating the conditions under which the intervention occurred. Further, if the trained machine learning model is employed or there is a possibility that it will be adopted for the control model (30, 35), the intervention history 60 may include information for generating learning data that can be used to train the machine learning model. In one example, to identify a model to improve, the intervention archival record 60 may include information (e.g., an identifier, etc.) to identify the control model that was used when the intervention occurred. The intervention archival record 60 may further include an intervention operation 55 by the user or a path by the operation 55. Information indicating the conditions of the environment in which the intervention occurred included in the intervention archival record 60 may be used as training data (input data), and the operation 55 of the intervention by the user or the path by the operation 55 thereof may be used as correct answer data (teacher signal, label). In this case, the control model composed of the machine learning model may be updated (relearning, additional learning, etc.) according to the obtained intervention archival record history 60. Machine learning for updating may be performed in the control device 1 or may be executed on a computer other than the control device 1 (e.g., an external server). Note that the data format of the intervention archival record 60 may be appropriately determined according to the embodiment. The intervention archival record 60 may be kept in any database format.

Figure 2:
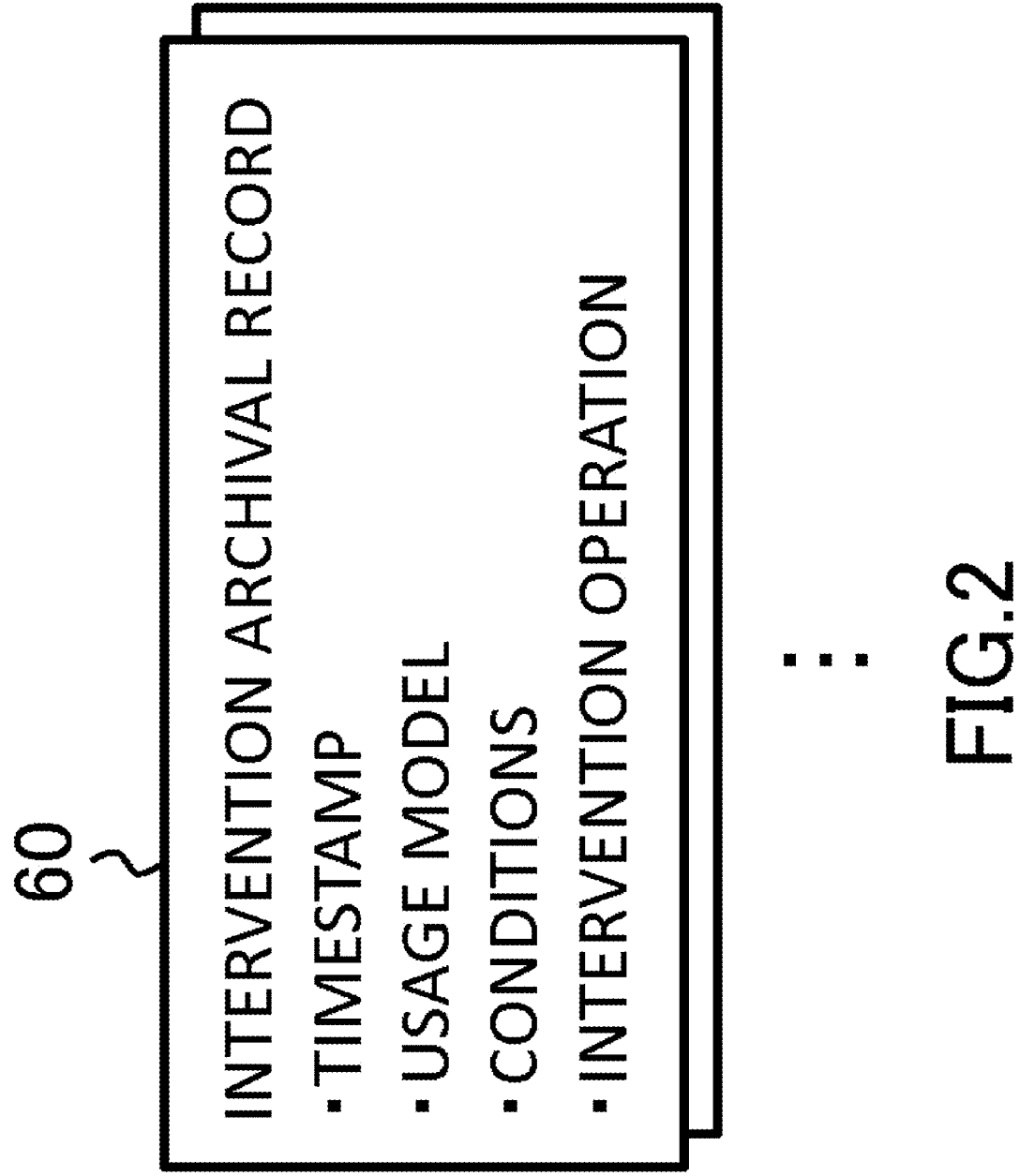
FIG. 2 schematically indicates an example of the data structure of the intervention archival record of the present disclosure.

FIG. 2 schematically indicates an example of the data structure of the intervention archival record 60 according to the present embodiment. In the example of FIG. 2, the record of the intervention archival record 60 includes a time stamp, identification information of the control model used (usage model), conditions of the environment in which the intervention occurred, and information indicating the operation of the intervention. The timestamp indicates the date and time when the intervention occurred. The date and time indicated by the timestamp may be used to delete old records, identify records that reflect conformability criteria 20 (when reflecting intervention archival record within a certain period of time in conformability criteria 20), and the like. Note that a record of the intervention archival record 60 may be generated for each intervention operation. The unit of intervention operation indicated by the record may be arbitrarily determined. In one example, one record (sample of intervention history) may be generated for each intervention operation. In another example, one record may be generated in response to multiple interventions.

[2 Configuration Example]

Figure 3:
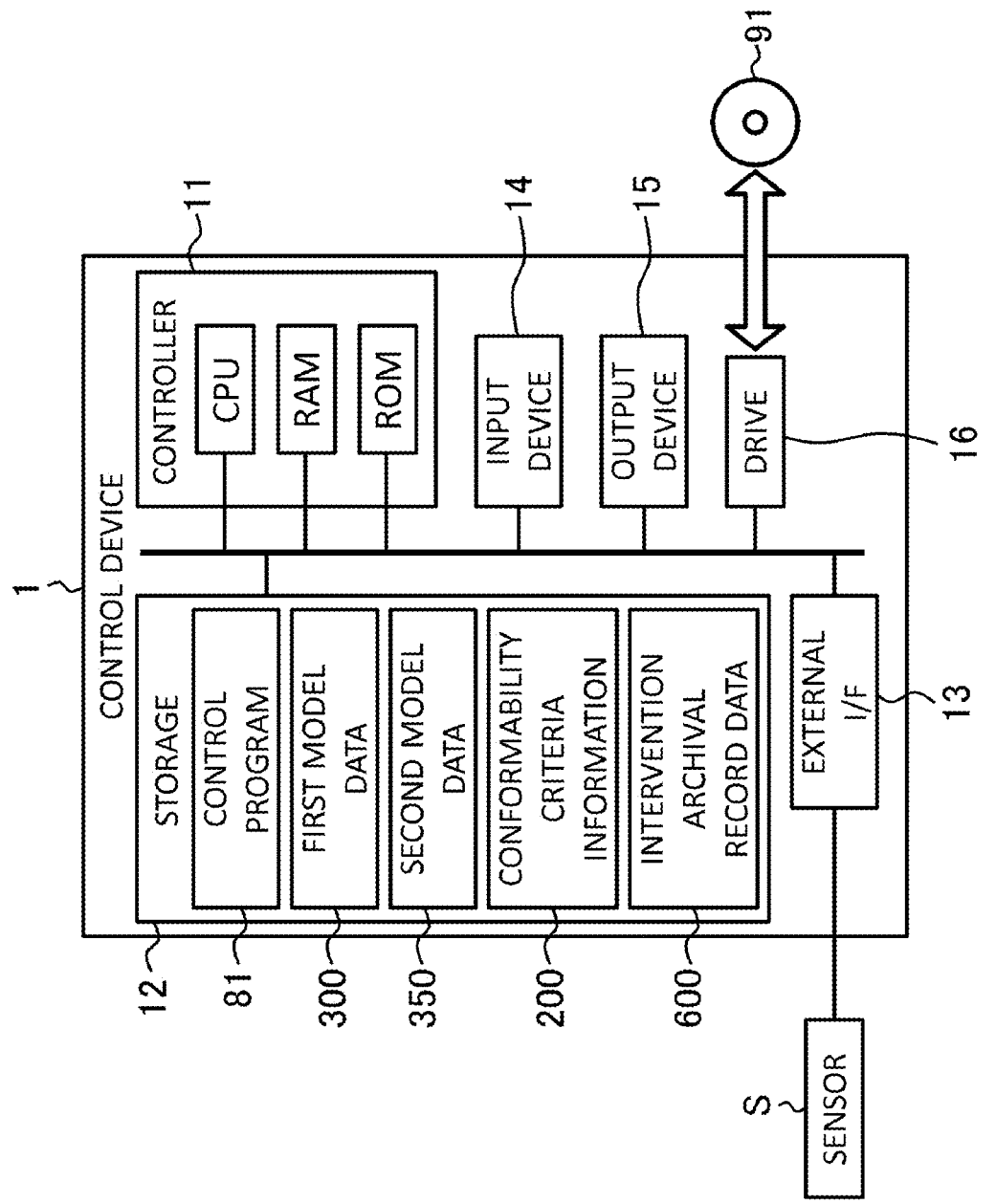
FIG. 3 schematically indicates an example of the hardware configuration of the control device of the present disclosure.

FIG. 3 schematically indicates an example of the hardware configuration of the control device 1 according to the present embodiment. The control device 1 according to the present embodiment is a computer in which the controller 11, the storage 12, the external interface 13, the input device 14, the output device 15, and the drive 16 are electrically connected.

The controller 11 includes a CPU (Central Processing Unit), RAM (Random Access Memory), ROM (Read Only Memory), and the like, and is configured to execute arbitrary information processing based on a program and various data. The controller 11 (CPU) is an example of a processor resource. The storage 12 may be configured of, for example, a hard disk drive, a solid-state drive, or the like. The storage 12 (and RAM, ROM) is an example of a memory resource and is an example of the storage of the present disclosure. In the present embodiment, the storage 12 stores various information such as a control program 81, a first model data 300, a second model data 350, conformability criteria information 200, and intervention archival record data 600.

The control program 81 is a program for causing the control device 1 to execute information processing (FIG. 4 described later) for controlling the mobile body M. The control program 81 includes a series of instructions for the information processing. The first model data 300 is configured to indicate information about the first control model 30. The second model data 350 is configured to indicate information about the second control model 35. In one example, when a machine learning model is employed as the control model, the model data (300, 350) may include information indicating the value of the operational parameter adjusted by machine learning. Optionally, the model data (300, 350) may further include information indicating the configuration of the machine learning model (eg, the structure of a neural network, etc.). In another example, when a rule-based model is employed as the control model, the model data (300, 350) may include information indicating a rule-based model (rule). The conformability criteria information 200 may be appropriately configured to indicate the conformability criteria 20. The intervention archival record data 600 may be appropriately configured to indicate the intervention archival record 60.

The external interface 13 may be, for example, a USB (Universal Serial Bus) port, a dedicated port, a wireless communication port, or the like, and is configured to connect to an external device by wire or wirelessly. In the present embodiment, the control device 1 may be connected to the sensor S via the external interface 13. The input device 14 is, for example, a device for performing input such as a mouse, a keyboard, an operator, and the like. The output device 15 is a device for outputting a display, a speaker, or the like, for example. The input device 14 and the output device 15 may be integrally configured by, for example, a touch panel display or the like.

The drive 16 is a device for reading various information such as a program stored on the storage medium 91. At least one of the control program 81, the first model data 300, the second model data 350, the conformity criteria information 200, and the intervention history data 600 may be stored on the storage medium 91 instead of or together with the storage unit 12. The storage medium 91 is configured to store the information by electrical, magnetic, optical, mechanical or chemical action so that a machine such as a computer can read various information (such as a stored program). The control device 1 may acquire at least one of the control program 81, the first model data 300, the second model data 350, the conformability criteria information 200, and the intervention archival record data 600 from the storage medium 91. The storage medium 91 may be a disk-type storage medium such as a CD or DVD, or a storage medium other than a disk-type such as a semiconductor memory (for example, flash memory). The type of drive 16 may be appropriately selected according to the type of storage medium 91.

Regarding the specific hardware configuration of the control device 1, the component can be omitted, replaced, and added as appropriate according to the embodiment. For example, the controller 11 may include a plurality of hardware processors. The hardware processor may be configured of a microprocessor, an FPGA (field-programmable gate array), a DSP (digital signal processor), an ECU (Electronic Control Unit), a GPU (Graphics Processing Unit), and the like. At least one of the external interface 13, the input device 14, the output device 15, and the drive 16 may be omitted. The control device 1 may include a communication interface and be configured to perform data communication with an external computer. At least one of the input device 14, the output device 15 and the drive 16 may be connected via an external interface or communication interface. The control device 1 may be a general-purpose computer, a terminal device, or the like in addition to a computer designed exclusively for the service provided. When the mobile body M is a vehicle, the control device 1 may be an in-vehicle device.

[3 Operation Example]

Figure 4:
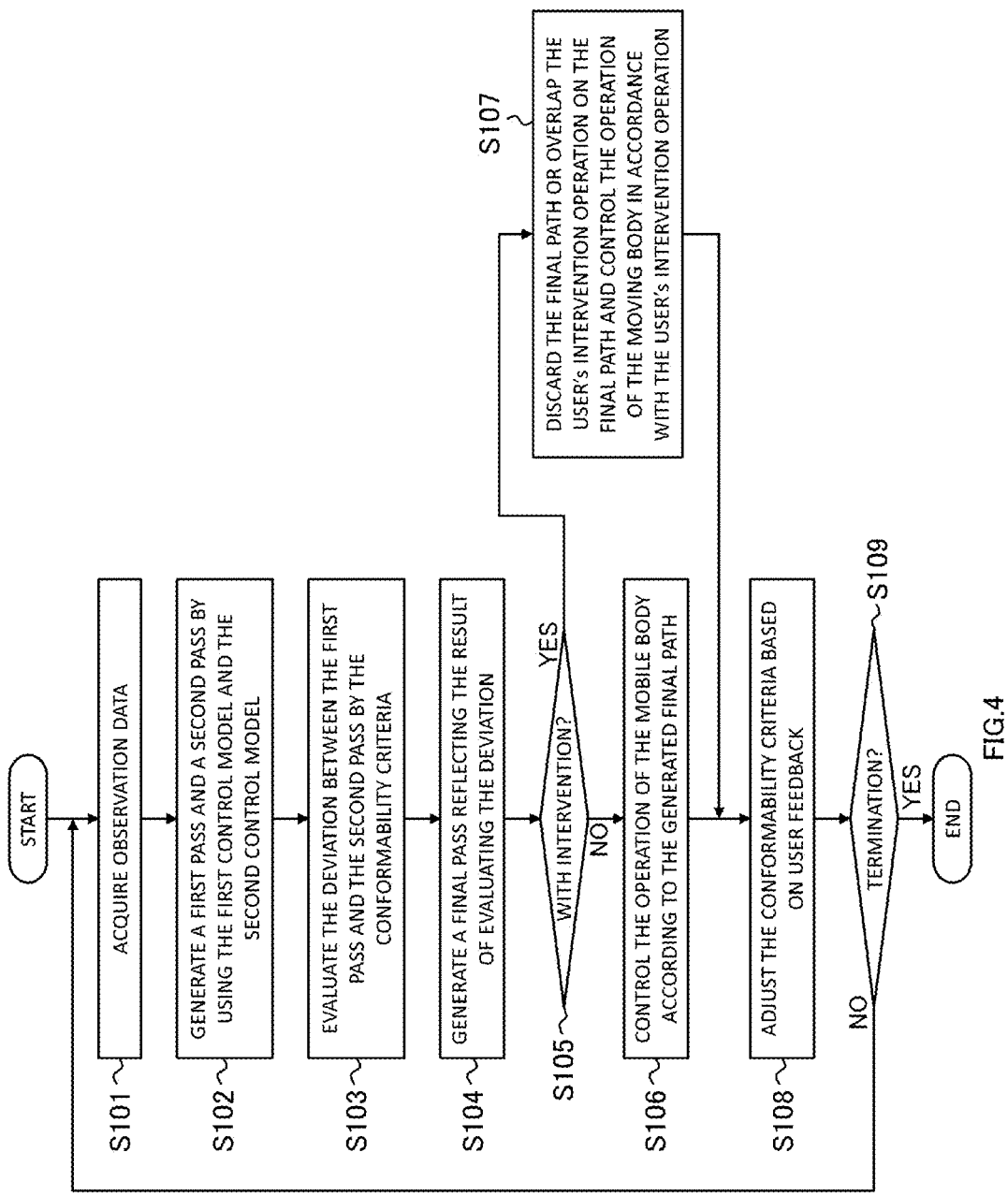
FIG. 4 shows an example of a processing procedure related to control by the control device of the present disclosure.

FIG. 4 indicates an example of a processing procedure related to the control of the mobile body M by the control device 1 according to the present embodiment. The controller 11 of the control device 1 executes instructions included in the control program 81 by the CPU. Thereby, the control device 1 operates as a computer capable of performing the following information processing. The following processing procedure is an example of a control method executed by a computer. However, the following processing procedure is only an example, and each step may be modified as much as possible. Further, the following processing steps can be omitted, replaced, and added as appropriate according to the embodiment.

In step S101, the controller 11 acquires observation data of the sensor S. The controller 11 may directly or indirectly acquire observation data from the sensor S. In step S102, the controller 11 generates a first pass 40 and a second pass 45 by using the first control model 30 and the second control model 35. The calculations of each control model (30, 35) may be executed accordingly. In one example, when a trained machine learning model is adopted for at least one of the control models (30, 35), the controller 11 may obtain a path derivation result by inputting at least a portion of the observation data into the trained machine learning model and performing computational processing of the trained machine learning model. In another example, if a rule-based model is employed in at least one of the control models (30, 35), the controller 11 may derive a path from the environment indicated by at least a portion of the observation data according to the rule.

In step S103, the controller 11 evaluates the deviation between the generated first pass 40 and the second pass 45 by the conformability criteria 20. In step S104, the controller 11 generates a final pass 50 from the first pass 40 and the second pass 45 reflecting the result of evaluating the deviation. In one example, the controller 11 may select either the first pass 40 or the second pass 45 as the final pass 50 according to the evaluation result. In another example, the controller 11 may generate a final pass 50 by integrating the first pass 40 and the second pass 45. The processes of steps S103 and S104 may be executed separately or may be executed as a series of processes depending on the arithmetic model.

In step S105, the controller 11 determines whether or not the user has an intervention operation 55. The controller 11 may accept an intervention operation 55 by the user at any time while controlling the operation of the mobile body M. If the intervention operation 55 has not been accepted (if there is no intervention operation 55), the controller 11 advances the process to step S106. On the other hand, when the intervention operation 55 is accepted (there is an intervention operation 55), the controller 11 proceeds to step S107.

In step S106, the controller 11 controls the operation (movement) of the mobile body M according to the generated final path 50. When the operation control is completed, the controller 11 proceeds with the process to the next step S108. In step S107, the controller 11 discards the generated final path 50 or overlaps the user's intervention operation 55 on the final path 50 and controls the operation (movement) of the moving body M in accordance with the user's intervention operation 55. When the operation control is completed, the controller 11 proceeds with the process to the next step S108.

In step S108, the controller 11 adjusts the conformability criteria 20 based on user feedback. The controller 11 adjusts the conformability criteria 20 so that the less the operation 55 of intervention by the user is performed, the more priority is given to the first path 40 and the final path 50 is generated (e.g., increase the threshold value, increase the integration ratio of the first path 40). On the other hand, the controller 11 adjusts the conformability criteria 20 so that the final pass 50 is generated with preference to the second pass 45 as much as the intervention operation 55 by the user is performed with respect to the automatic control of the first pass 40 priority (for example, the threshold value is reduced, the integration ratio of the second path 45 is increased).

In step S109, the controller 11 determines whether or not to terminate the control of the mobile body M. The criteria for judgment may be set arbitrarily. In one example, while activating the mobile body M, the controller 11 determines that the control of the mobile body M is not terminated, whereas an arbitrary termination instruction (for example, an operation of termination by the user via the input device 14), it may be determined that the control of the mobile body M is terminated. When it is determined that the control is not terminated, the controller 11 returns to step S101 and executes the process again from step S101. On the other hand, when it is determined that the control is terminated, the processing procedure of the control device 1 according to the present operation example is terminated.

Note that the processing order of each step may not be limited to the example of FIG. 4 and may be appropriately changed according to the embodiment. For example, the process of step S108 may not be executed for each control cycle. In another example, the process of step S108 may be performed at predetermined intervals (e.g., predetermined number of times/predetermined time elapses, ignition ON/OFF). In yet another example, the process of step S108 may be executed independently of the processing of steps S101~steps S107. When the process of step S108 (adjustment of the conformability criteria 20) is executed after the fact, the controller 11 generates information indicating the operation 55 of the intervention by the user, and the generated information may be stored in a predetermined storage area as the intervention archival record 60. In one example, the predetermined storage area may be RAM, a storage 12, a storage medium 91, or the like. When the control device 1 is configured to be communicative, the predetermined storage area may be an external computer. The controller 11 may adjust the conformability criteria 20 at any timing using the obtained intervention archival record history 60.

[Features]

In this embodiment, by the processing of step S108, the conformability criteria 20 is adjusted based on user feedback so that the more intervention operation 55 is performed, the more priority is given to the second control model 35, and the less intervention operation 55 is performed, the more priority is given to the first control model 30. As a result, in the process of step S104, the final path 50 is generated with the second path 45 being given priority as more intervention occurs, and the first path 40 being given priority as less intervention occurs. As a result, the first control model 30 (first pass 40) is preferentially used, and the scene in which automatic control is executed by the process of step S106 (the usage scene of the first control model 30) can be narrowed down to a range where nonconformity does not occur. Therefore, according to the present embodiment, it can be expected to suppress an increase in automatic control inconformity due to model change.

[4 Modifications]

As described above, embodiments of the present disclosure have been described in detail, but the description up to the above is only an example of the present disclosure in all respects. Needless to say, various improvements or modifications can be made without departing from the scope of the present disclosure. The processes and means described in the present disclosure can be freely combined and implemented insofar as no technical contradictions arise.

What is claimed is:

1. A control device comprising:
a storage that stores a first control model and a second control model, and
a controller,
wherein the first control model is newly deployed with respect to the second control model,
wherein the controller is configured to perform:
generating a first path by using the first control model,
generating a second path by using the second control model,
evaluating a deviation between the generated first path and the generated second path by conformability criteria,
generating a final path from the first path and the second path reflecting a result of evaluating the deviation, and
controlling a movement of a mobile body according to the generated final path, and
wherein the conformability criteria have been adjusted by feedback of a user so that the less an operation of intervention by the user is performed, the more the first path is prioritized in generating the final path, and the more the operation of intervention by the user is performed, the more the second path is prioritized in generating the final path.

2. The control device according to claim 1, wherein the first control model is configured by a trained machine learning model, and
the second control model is configured by a rule-based model.

3. The control device according to claim 1, wherein the first control model is configured by an updated trained machine learning model,
the second control model is configured by a trained machine learning model before updating.

4. The control device according to claim 1, wherein the generating the final path from the first path and the second path comprises:
selecting either the first path and the second path as the final path, or generating the final path by integrating the first path and the second path.

5. The control device according to claim 1, wherein the mobile body is a vehicle.

* * * * *